3,321,460
DISPERSE MONOAZO DYES
Jacques Voltz and Werner Bossard, Riehen, Switzerland, assignors to J. R. Geigy, A.-G., Basel, Switzerland
No Drawing. Filed Oct. 31, 1963, Ser. No. 320,531
Claims priority, application Switzerland, Oct. 31, 1962, 12,764/62
7 Claims. (Cl. 260—207)

The present invention concerns new water-dispersible monoazo dyestuffs, processes for the production thereof, processes for the dyeing of organic hydrophobic material using the new dyestuffs and, as industrial product, the material dyed with the aid of these dyestuffs.

It is an object of the invention to provide new water-dispersible dyestuffs which afford dyeings on organic hydrophobic materials, and especially on hydrophobic polyester textile materials, which possess better fastness to sublimation than known dyestuffs of the monoazo class, and which show, at the same time, little or no decrease in drawing power on such fibers.

It is another object of the invention to provide new "disperse" dyes which yield dyeings on the aforesaid hydrophobic materials, having the above-mentioned advantageous properties, while said dyestuffs also show a fair to good reserve on wool and cotton, but dye synthetic polyamide fibers.

The aforesaid objects as well as others which will become apparent as the description of this invention proceeds, have been attained by this invention which comprises novel water-dispersible monoazo dyestuffs of the formula

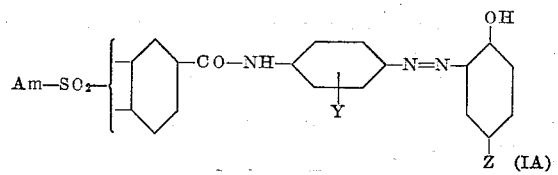

wherein Am represents an amino radical of the formulas

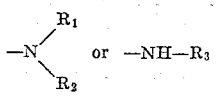

each of $R_1$ and $R_2$, independently of the other, representing lower alkyl, lower alkoxy-lower alkyl, cyano-lower alkyl or hydroxy-lower alkyl, lower alky in the three last-mentioned radicals having at least 2 carbon atoms, and
$R_3$ representing alkoxy-alkyl or alkyl, each with from 4 to preferably not more than 6 carbon atoms, the "alkyl" moiety in the aforesaid cyano- and alkoxy-alkyl radicals having at least 2 carbon atoms,
Y represents preferably hydrogen, or chlorine, bromine, lower alkyl, or lower alkoxy, preferably methoxy, and
Z represents lower alkyl, preferably with not more than 2 carbon atoms, chlorine or bromine.

Particularly satisfactory results are obtained with the disperse dyes of the formula

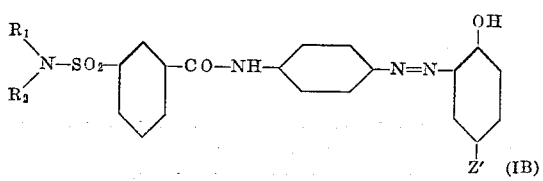

wherein $R_1$ and $R_2$ have the meanings given above, and Z' represents methyl, ethyl or chlorine.

"Lower" used in this specification and the appended claims in connection with aliphatic radicals means radicals of from 1 to 4 carbon atoms, unless stated otherwise.

The radicals $R_1$ and $R_2$ in Formula IB are preferably lower alkyl groups, in particular methyl or ethyl groups.

While the dyestuffs of Formula IA are distinguished by unexpectedly good drawing power on polyester fibers, and particularly on terephthalate and the like ester fibers and also on cellulose tri-acetate fibers, and while the dyeings on these textile fibers possess very good fastness to sublimation and hence fastness to pleating, the structurally related compounds in which $R_3$ is replaced by an alkyl radical of less than 4 carbon atoms are too water-soluble to be used as disperse dyes.

The fair to good reserve on wool, cotton, and the like fibers shown by the dyestuffs of Formula IA, makes them very well suited for the dyeing of blends of polyester textile materials with wool or cotton.

The good drawing power of the dyestuffs of Formula IA, particularly on polyester fibers, is particularly surprising, since it is well known that introduction of sulfamyl groups into disperse azo dyestuffs of the general class to which the dyestuffs of Formula I pertain, leads to a marked deterioration of drawing power.

The dyestuffs of Formula IA, as well as other structurally related dyestuffs, are produced by coupling the diazonium compound of an amine of the formula

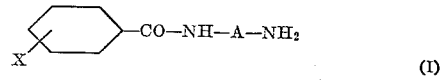

with a para-substituted hydroxybenzene coupling in o-position to the hydroxyl group, to form monoazo compounds of formula

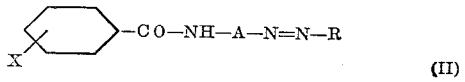

In these formulas,

X represents a sulfamyl group derived from a primary or secondary amine, preferably of the type defined as Am in Formula IA.
R represents the radical of a para-substituted hydroxybenzene coupled in o-position to the hydroxyl group, and
A represents a p-phenylene radical which can contain the substituents conventional in azo dyestuffs, the components, however, being so chosen that the monoazo dyestuff of Formula II contains no water-solubilizing groups which dissociate acid in water.

The radical X in Formulas I and II is a sulfonamide group which may be mono- or di-substituted by lower normal or branched chained alkyl groups which can, in turn, be substituted by halogen, cyano, hydroxyl or alkoxy groups, a benzyl or phenyl group which may be substituted by alkyl or alkoxy radicals or by halogen atoms. Also, the amino moiety of the sulfamyl group can be a heterocyclic radical.

Thus, the sulfamyl groups X in Formulas I and II contain primary, secondary or tertiary nitrogen. The nitrogen substituents of the sulfamyl group X can be, for example, hydrogen, methyl, ethyl, propyl, butyl, cyclohexyl, phenyl, tolyl, benzyl, hydroxyethyl, cyanoethyl, methoxyethyl and methoxypropyl groups combined in any way as desired. For example, they are derived from amines such as ammonia, mono-alkylamines such as methylamine, ethylamine, propylamine, isopropylamine, n-, sec.- or tert. butylamine, hydroxyalkylamines such as β-hydroxyethylamine or γ-hydroxypropylamine, alkoxyalkylamines such as β-methoxyethylamine or β-ethoxyethylamine, γ-methoxypropylamine, γ-ethoxypropylamine or γ-phenoxypropylamine, aralkylamines such as benzylamine, arylamines such as phenylamine or methylamine, methoxyphenylamine or ethoxyphenylamine, also dialkylamines such as dimethylamine, diethylamine, dipropylamine, dibutylamine, di-(β-hydroxyethyl)-amine or N-methyl-N-β-hydroxyethylamine, N-alkyl-N-aralkylamines such as N-methyl-N-benzylamine, or N-alkyl-N-arylamines such as N-methyl-N-phenylamine, N-ethyl-N-phenylamine or N-(β-hydroxyethyl)-N-phenylamine, or cyclic secondary amines such as piperidine, piperazine or morpholine.

The group X can be in the m- or p-position to the —CO—NH— bridge in Formula I. For technical reasons, however, the meta position is preferred. X can also be in ortho-position as shown in Formula II, but are difficult to produce.

In the production of compounds of Formula II, the phenylene radical A bound in 1,4-position can contain other substituents conventional in azo dyestuffs, of the type described, for example, halogen atoms such as fluorine, chlorine or bromine, alkyl groups such as the methyl or ethyl radicals, alkoxy groups such as the methoxy or ethoxy radicals, or also nitro groups.

As substituents in the p-position to the hydroxy groups, the radical R contains, e.g. alkyl groups such as the methyl, ethyl, propyl, isopropyl, butyl, tert. butyl or amyl group, halogen atoms such as chlorine or bromine, alkoxy radicals such as methoxy or ethoxy groups, aralkyl radicals such as the benzyl group, and aryl radicals such as the phenyl or methylphenyl group. Thus, for example, 1-hydroxy-4-methylbenzene, 1-hydroxy-4-ethylbenzene, 1-hydroxy-4-propylbenzene, 1-hydroxy-4-isopropylbenzene, 1-hydroxy-4-butylbenzene, 1-hydroxy-4-tert. butylbenzene, 1-hydroxy-4-amylbenzene, 1-hydroxy-4-benzylbenzene, 1-hydroxy-4-cyclohexylbenzene, 1-hydroxy-4-phenylbenzene, 1-hydroxy-4-(4'-methoxyphenyl)-benzene, 1-hydroxy-4-(4'-chlorophenyl)-benzene are used as coupling components. 1-hydroxy-4-alkylbenzenes such 1-hydroxy-4-methylbenzene are preferred.

The amines of the general Formula I used as starting materials are obtained, e.g. by reduction of nitro compounds of the formula

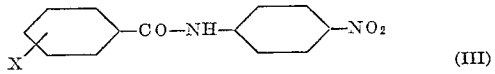

(III)

which are obtained by condensation of 2-, 3- or 4-sulfamyl benzoic acid halides. This condensation is performed in a conventional manner.

The diazotized amines of Formula I are coupled with the para-substituted hydroxybenzenes, preferably in an alkaline aqueous medium. The difficulty water-soluble dyestuffs are isolated by filtration. If desired, a suitable diazonium compound can also be coupled simultaneously with a mixture of two or more coupling components usable according to the invention.

A modification of the process for the production of monoazo dyestuffs which are difficulty soluble in water consists in condensing an aminoazo compound of formula $$H_2N—A—N=N—R \qquad (IV)$$

with a reactive functional derivative of a benzene carboxylic acid of formula

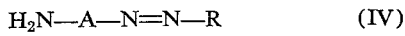

(V)

to form monoazo dyestuffs of Formula II, the components being so chosen that the monoazo dyestuff II contains no water-solubilizing groups which dissociate acid in water.

The remarks regarding A, R and X in the first process are also valid for this process.

Suitable reactive functional derivatives of benzene carboxylic acids of Formula V are preferably their halides such as the chlorides or bromides. The reaction of these compounds witht he aminoazo compounds of the Formula IV is preferably performed in solution in an indifferent organic solvent such as benzene, toluene, xylenes, chlorobenzenes, dichlorobenzene, pyridine, ethylmethyl ketone etc. or also in a very fine aqueous suspension, preferably in the presence of a proton acceptor such as sodium acetate or pyridine. The reaction temperature can very within wide limits depending on the reaction conditions. The dyestuffs are isolated by filtration, concentration of the solvent or precipitation from the solvent with suitable agents in the usual manner.

The dyestuffs of Formula II according to the invention are capable of dyeing hydrophobic synthetic organic textile fibers from aqueous dispersion, e.g. they can be used for the dyeing of cellulose di- to triacetate, particularly however, for the dyeing of high molecular esters of aromatic polycarboxylic acids with polyfunctional alcohols such as glycol/terephthalate Terylene, Dacron, Tergal, Trevira, or Kodel.

These dyestuffs also dye synthetic polyamides such as nylon, nylon 6 and nylon 66.

Polyester fibers are dyed with aqueous dispersions of dyestuffs according to the invention preferably at temperatures of over 100° C. under pressure. The dyeing, however, can also be performed at the boiling point of the dyebath in the presence of carriers such as phenylphenols, polychlorobenzene compounds or similar auxiliaries. In individual cases, the drawing power of the dyestuffs can be further improved by mixing two or more of the monoazo dyestuffs according to the invention.

The yellow dyeings produced on polyester fibers with the dyestuffs according to the invention are distinguished by their excellent wet and light fastness properties. In contrast to the monoazo dyestuffs of similar structure disclosed in the French Patent No. 986,714, particularly the new dyestuffs of Formula IA have excellent sublimation fastness properties.

In addition, some of the new dyestuffs are suitable for the dyeing of lacquers, oils, synthetic resins or synthetic fibers in the mass.

The following non-limitative examples illustrate the invention further. Where not otherwise expressly stated, parts and percentages are given by weight. The temperatures are in degrees centigrade. The relationship of parts by weight to parts by volume is as that of grams (g.) to milliliters (ml.).

Example 1

26.4 parts of benzoic acid chloride-3-(sulphonic acid butylamide) are added to a solution of 22.7 parts of 2-hydroxy-5-methyl-4'-amino-1,1'-azobenzene in 150 parts of anhydrous pyridine while stirring with good external cooling. The temperature should not exceed 25°. The mixture is heated to 90–100° within one hour and the reaction mass is kept for 2 hours at this temperature. When no more starting dyestuff can be traced, the mixture is cooled to room temperature and poured into 1000 parts of water. After acidifying the aqueous suspension with concentrated hydrochloric acid, the precipitated dyestuff is filtered off under suction, washed with a lot of water and dried in vacuo.

The yellow product so obtained, which melts at 190–195°, dissolves in dimethyl formamide and in concentrated sulphuric acid with a yellow colour. When milled with a condensation product of naphthalene sulphonic acids and formaldehyde, the dyestuff so obtained, which corresponds to the formula

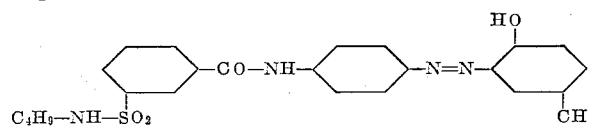

dyes polyester fibres such as Dacron in yellow shades which have excellent fastness to light, wet and sublimation.

The benzoic acid chloride derivative is produced from benzoic acid-3-sulphonic acid chloride and butylamine and then converting the condensation product (M.P. 198°)

with thionyl chloride into the benzoic acid chloride-3-(sulphonic acid butylamide).

If, instead of the 22.7 parts of 2-hydroxy-5-methyl-4'-amino-1,1'-azobenzene, corresponding amounts of 2-hydroxy-5-ethyl-4'-amino - 1,1' - azobenzene, 2 - hydroxy-5-methoxy-4'-amino-1,1'-azobenzene, 2 - hydroxy-5-chloro-4' - amino - 1,1' - azobenzene or 2-hydroxy-5-butyl-4,4'-amino-1,1'-azobenzene are used, then dyestuffs are obtained which produce dyeings on polyester fibres having equally good properties.

Example 2

7.2 parts of the most finely pulverised 1-amino-4-[3'-(sulphonic acid-N,N-diethylamido) - benzoylamino]-benzene are pasted in a mixture of 150 parts of water and 10 parts of concentrated hydrochloric acid and, at 0–5°, a solution of 1.4 parts of sodium nitrite in 5 parts of water is added. The diazonium salt solution so obtained is poured into a solution, cooled to 0–5°, of 2.3 parts of 1-hydroxy-4-methylbenzene in 50 parts of water, 0.1 part of sodium hydroxide and 0.8 part of sodium carbonate. On completion of the coupling, the precipitated dyestuff is filtered off under suction, washed with a lot of water and dried in vacuo.

The coupling product is a yellow powder which melts at 179–181° of the formula

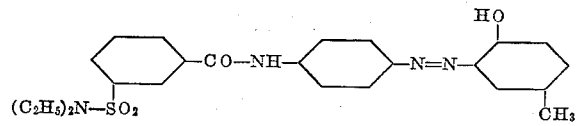

It dissolves in dimethyl formamide and concentrated sulphuric acid with a yellow colour.

A dyestuff preparation milled with a condensation product of naphthalene sulphonic acids and formaldehyde, which preparation contains the dyestuff of fine distribution, dyes polyglycol terephthalate fibres such as Terylene in pure yellow shades from an aqueous dispersion, preferably in the presence of carriers such as o-phenylphenol. The dyeings are fast to washing, rubbing and light and have excellent fastness to sublimation.

The 1-amino-4-[3'-(sulfonic acid-N,N-dimethylamido)-benzoylamino]-benzene used as diazo component is obtained from benzoic acid chloride-3-(sulfonic acid-N,N-dimethylamide) and 1-amino-4-nitrobenzene and then reducing the condensation product to form the corresponding amine.

By using, in the above example, instead of the 7.2 parts of 1-amino-4-[3'-sulfonic acid-N,N-diethylamido)-benzoylamino]-benzene, the corresponding amounts of:

| Example No. | | Shade on polyester fibers |
|---|---|---|
| 3 | 1-amino-4-[3'-(sulfonic acid-N,N-dimethyl-amido)-benzoylamino]-benzene. | Yellow. |
| 4 | 1-amino-4-[3'-(sulfonic acid-N-ethyl-N-(β-hydroxyethyl)-amido)-benzoylamino]-benzene. | Do. |
| 5 | 1-amino-4-[3'-(sulfonic acid-methylamido)-benzoylamino]-benzene. | Do. |
| 6 | 1-amino-4-[3'-(sulfonic acid-ethylamido)-benzoylamino]-benzene. | Do. |
| 7 | 1-amino-4-[3'-(sulfonic acid-n-butylamido)-benzoylamino]-benzene. | Do. |
| 8 | 1-amino-4-[3'-(sulfonic acid-tert.butylamido)-benzoylamino]-benzene. | Do. |
| 9 | 1-amino-4-[3'-(sulfonic acid-n-pentylamido)-benzoylamino]-benzene. | Do. |
| 10 | 1-amino-4-[3'-(sulfonic acid-sec.-hexylamido)-benzoylamino]-benzene. | Do. |
| 11 | 1-amino-4-[3'-(sulfonic acid-γ-methoxypropyl)-amido-benzoylamino]-benzene. | Do. |
| 12 | 1-amino-4-[4'-(sulfonic acid-N,N-dimethyl-amido)-benzoylamino]-benzene. | Do. |
| 13 | 1-amino-4-[4'-(sulfonic acid-N,N-diethylamido)-benzoylamino]-benzene. | Do. |
| 14 | 1-amino-4-[4'-(sulfonic acid-butylamido)-benzoylamino]-benzene. | Do. | yellow dyestuffs are obtained which produce dyeings on polyester fibers having equally good dyeing properties.

Example 15

3 parts of the dyestuff obtained according to Example 1 are dispersed in 4000 parts of water. 25 parts of the sodium salt of o-phenylphenol and 25 parts of diammonium phosphate are added to this dispersion and 100 parts of polyglycol terephthalate yarn are dyed therein for 90 minutes at 95–98°. The dyeing is rinsed and aftertreated with sodium hydroxide solution and a fatty alcohol/polyethylene oxide condensation product. Under these conditions, a pure yellow dyeing is obtained which has very good fastness to sublimation and light.

Example 16

2 parts of the dyestuff obtained according to Example 2 are finely suspended in 2000 parts of water which contains 4 parts of a formaldehyde/naphthalene sulfonic acid condensation product. The suspension is prepared in a pressure dyeing apparatus. The pH of the dye-bath is adjusted to 6–6.6 with acetic acid. 100 parts of polyglycol terephthalate yarn are entered at 50°, the bath is heated to 120° within 30 minutes and the yarn is dyed for 50 minutes at this temperature. The dyed goods are then rinsed with water, soaped and dried. Under these conditions a pure yellow dyeing is obtained which is fast to washing, rubbing, light and sublimation.

The dyestuffs described in the other examples, produce dyeings of equal quality by this process.

Example 17

Polyglycol terephthalate fabric such as dacron of E. J. du Pont is impregnated in a foulard at 40° with a liquor of the following composition:

20 parts of the dyestuff obtained according to Example 1 finely dispersed in
7.5 parts of sodium alginate,
20 parts of triethanolamine,
20 parts of a fatty alcohol/polyethylene oxide condensation product, and
900 parts of water.

The fabric is squeezed out to 100% content, dried at 100° and then the dyeing is fixed for 30 seconds at a temperature of 210°. The dyed goods are rinsed with water, soaped and dried. Under these conditions, a yellow dyeing is obtained which is fast to washing, rubbing, light and sublimation.

The dyestuffs described in the other examples produce dyeings of equal quality by this process.

Dyestuffs of Formula II which contain the substituent X in ortho position to the —CO—NH— bridge are also useful as polyester dyes. The following example illustrates the production of such a dyestuff according to the invention.

Example 18

7.2 parts of the most finely pulverized 1-amino-4-[2'-(sulfonic acid - N,N - diethylamido)-benzoylamino]-benzene are pasted in a mixture of 150 parts of water and 10 parts of concentrated hydrochloric acid and, at 0–5°, a solution of 1.4 parts of sodium nitrite in 5 parts of water is added. The diazonium salt solution so obtained is poured into a solution, cooled to 0–5°, of 2.3 parts of 1-hydroxy-4-methylbenzene in 50 parts of water, 0.1 parts of sodium hydroxide and 0.8 parts of sodium carbonate. On completion of the coupling, the precipitated dyestuff is filtered off under suction, washed with a lot of water and dried in vacuo.

The coupling product is a yellow powder which melts at 179–181° of the formula

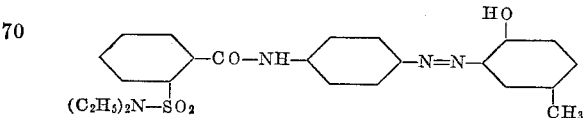

It dissolves in dimethyl formamide and concentrated sulfuric acid with a yellow color.

The 1-amino-4-[2'-(sulfonic acid-N,N-dimethylamido)-benzoylamino]-benzene used as diazo component is obtained from benzoic acid chloride-2-(sulfonic acid-N,N-dimethylamide) and 1-amino-4-nitrobenzene and then reducing the condensation product to form the corresponding amine.

The dyestuff of the above formula dyes polyethylene glycol terephthalate and the like polyester fibers in pure yellow shades from an aqueous dispersion.

We claim:
1. A disperse dyestuff of the formula

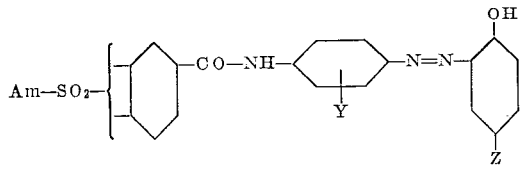

wherein A$m$ is a member selected from the group consisting of radicals of the formulas

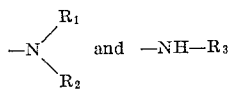

each of $R_1$ and $R_2$ is a member selected from the group consisting of lower alkyl, lower alkoxy-lower alkyl wherein the "alkyl" moiety has at least 2 carbon atoms, hydroxy-lower alkyl with alkyl of at least 2 carbon atoms and cyano-lower alkyl with alkyl of at least 2 carbon atoms, $R_3$ is a member selected from the group consisting of alkoxy-alkyl with a total of from 4 to 6 carbon atoms wherein the "alkyl" moiety has at least 2 carbon atoms, and alkyl of 4 to 6 carbon atoms, Y is a member selected from the group consisting of hydrogen, chlorine, bromine, lower alkyl and lower alkoxy, and Z is a member selected from the group consisting of lower alkyl, chlorine and bromine.

2. The compound of the formula

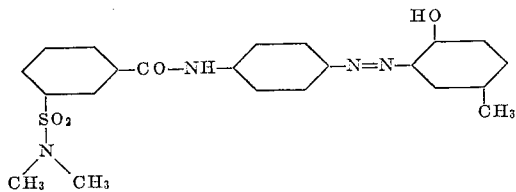

3. The compound of the formula

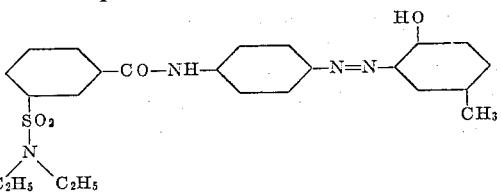

4. The compound of the formula

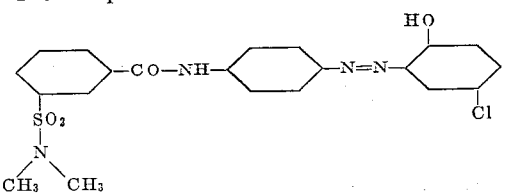

5. The compound of the formula

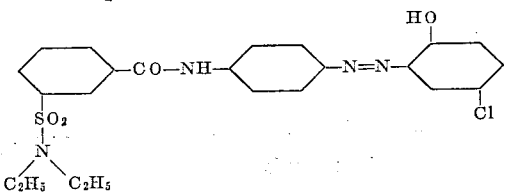

6. The compound of the formula

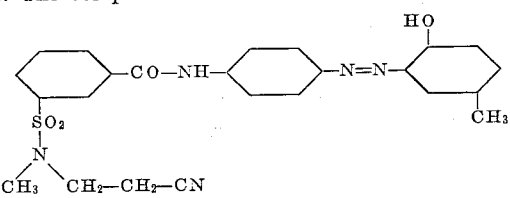

7. The compound of the formula

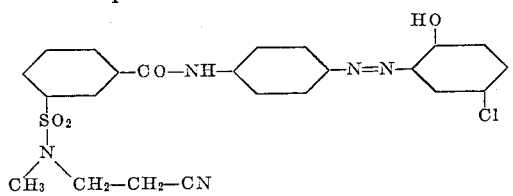

No references cited.

CHARLES B. PARKER, *Primary Examiner.*
DONALD PAPUGA, *Assistant Examiner.*